United States Patent [19]
Montjourides

[11] 3,734,246
[45] May 22, 1973

[54] HYDRAULIC BRAKE AUTOMATIC ADJUSTER

[75] Inventor: Pierre Montjourides, Saint-Maur, France

[73] Assignee: The Bendix Corporation, South Bend, Ind.

[22] Filed: June 23, 1971

[21] Appl. No.: 155,962

[30] Foreign Application Priority Data

June 25, 1970 France..................................7023565

[52] U.S. Cl..............................188/196 A, 188/351
[51] Int. Cl................................................F16d 65/74
[58] Field of Search...................................60/54.6 S; 188/196 A, 351

[56] References Cited
UNITED STATES PATENTS 2,345,811  4/1944  Harp.....................................188/351
3,077,738  2/1963  Van Der Wilt.....................60/54.6 S

FOREIGN PATENTS OR APPLICATIONS 543,729  3/1942  Great Britain........................188/351

Primary Examiner—Duane A. Reger
Attorney—William N. Antonis et al.

[57] ABSTRACT

This invention relates to a hydraulic brake automatic adjuster adapted to provide the proper clearance in released portion between rotatable and nonrotatable braking surfaces, and particularly to keep to a substantially predetermined value the volume of braking liquid necessary to operate at least one brake actuator whatever the wear of the friction element connected thereto.

2 Claims, 1 Drawing Figure

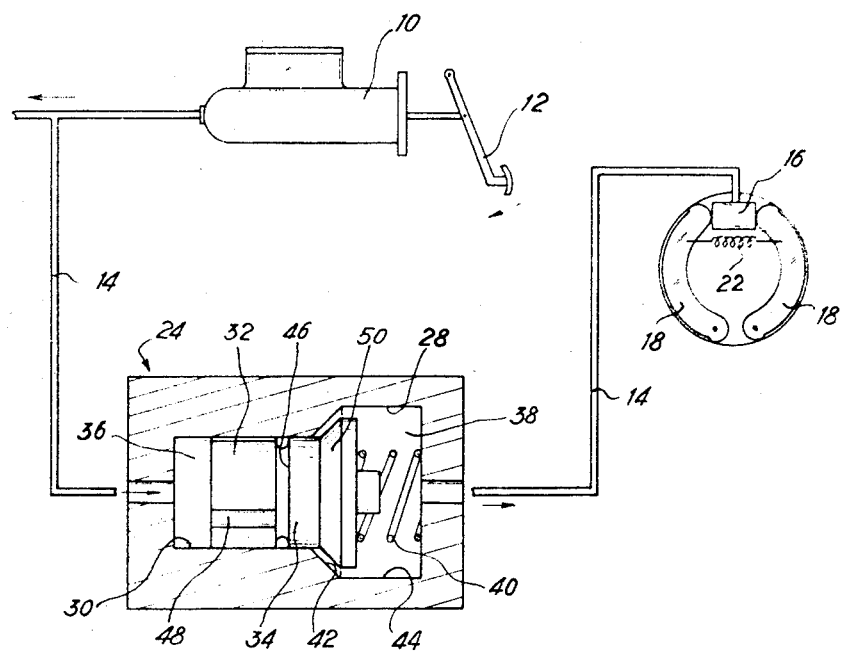

HYDRAULIC BRAKE AUTOMATIC ADJUSTER

This invention relates to a hydraulic brake automatic adjuster adapted to provide the proper clearance in released position between rotatable and nonrotatable braking surfaces and particularly to keep to a substantially predetermined value the volume of braking liquid necessary to operate at least one brake actuator whatever the wear of the friction elements connected thereto.

It has already been proposed a hydraulic brake automatic adjuster comprising in a housing a piston means sealingly reciprocable in a bore to define therein an inlet fluid chamber adapted to be connected to a variable hydraulic braking pressure source and an outlet fluid chamber adapted to be connected to the respective variable volume pressure chamber of at least one brake actuators, a resilient means for biasing said piston means inwardly said inlet chamber in engagement with fixed abutment means in said bore and a normally closed valve means for connecting said inlet chamber with said outlet chamber whenever the stroke of said piston means inwardly this latter chamber is above a predetermined value.

In such an automatic adjuster, the said valve means essentially consist of a movable valve member, generally pressure balanced, normally urged to sealingly abut a valve seat located in a fluid passage provided in the piston located between the inlet and the outlet chambers, an fixed abutment being adapted to move the valve member off its eat when the stroke of the piston exceeds a predetermined value for permitting fluid to flow from inlet chamber into outlet chamber.

As those adjusters are not easy to manufacture, their costs are generally high. Further more the fixed abutment prohibits to mount such an adjuster in the inlet port of the power chamber of a hydraulic brake actuator, said power chamber defining the output chamber of the adjuster.

In a view to provided a simple and cheap hydraulic adjuster able to be disposed at any place of a hydraulic braking system, the invention proposes a hydraulic brake adjuster as herein above described wherein said piston means is formed as a spool valve means having an annular land which is adapted to control the communication between one of said chambers and a recess provided in said housing and connected to the other chamber as a function of the relative position of said spool valve member forming piston means in said bore so as to define said normally closed valve means controlling the communication between said inlet and outlet chambers.

According to another feature of the invention said piston means is provided with an annular surface adapted to sealingly engage said fixed abutment means formed as an annular shoulder in said bore.

Other feature of the invention will appear in the following description taken in reference to the accompanying drawing in which the sole FIGURE is a diagrammatic view of a hydraulic braking system including a automatic adjuster according to the invention, illustrated in enlarged cross-section.

In the hydraulic braking system shown in the FIGURE a conventional master-cylinder 10 upon actuation from a brake pedal 12, defined a variable braking pressure source adapted to feed in fluid under pressure lines 14 connected to brake actuators 16. As illustrated in the FIGURE, the actuator 16 controls the displacement of shoes 18 of a drum brake against the force of a return spring 22.

An hydraulic brake automatic adjuster 24 is located between the master-cylinder 10 and the brake actuator 16 to compensate the increase of the volume of the power chamber of the latter as a result of the wear of the friction elements secured to the shoes 18, thereby limiting the dead stroke of the brake pedal 12 as those skilled of the art easily unterstand.

In the embodiment shown, adjuster 24 comprises a housing 26 with a stepped bore 28 therein. In smaller diameter portion 30 of bore 28 is slidably mounted a piston 32 formed as a spool valve member and having an annular land 34 sealingly cooperating with the portion 30. Piston 32 defines in bore 28 an inlet chamber 36 connected to master-cylinder 10, and an outlet chamber 38 connecting the power chamber of brake actuator 16. While piston 32 moves inwardly outlet chamber 38, against the lightly loaded return spring 40, the land 34 cooperates with a shoulder 42 located between the smaller and longer diameter portions 30 and 44 of bore 28 and an annular groove 46 provided in piston 32 connected by passages 48 located therein, thereby defining valve means controlling the fluid flow between chambers 36 and 38. As shown in the FIGURE the right end of piston 32 is provided with a head 50 whose frustoconical surface is adapted to sealingly engage a corresponding surface on shoulder 42.

The automatic adjuster operates as follow: Upon actuation of the brake pedal 12, the piston 32 is urged towards the right of the FIGURE by the pressure of the fluid contained in inlet chamber 36 and compresses the fluid contained in outlet chamber 38 connected to the brake actuator 16 thereby balancing the pressures in the chambers 36 and 38. In case of an important wear of friction element of shoes 18, the stroke of piston 32 exceeds a predetermined value so that the land 34 opens the passage between chambers 36 and 38 to permit fluid to flow from master-cylinder 10 into brake actuator 16.

When the brakes are released, the return spring 40 urges land 34 into portion 30 thereby insulating chambers 36 and 38. The load of brake spring 22 combined with the releasing of pressure in chamber 36 creates on the sides of piston 32 a differential of pressure which urges the latter towards the left of the FIGURE until the frustoconical surface of head 50 sealingly cooperates with shoulder 42.

It should be understood that the piston 32 retains in the portion of the hydraulic system associated to the actuator 16 a variable volume of braking liquid, the value of which increases upon the wear of the friction elements. It results therefrom that the return stroke of the friction elements of the drum brake is limited to a substantially predetermined value so as the dead stroke of the brake pedal.

It should be noted that the automatic adjuster herein above described can be used with a set of disc and/or drum brakes and can be located between the input port and power chamber of an usual hydraulic brake actuator.

What is claimed is:

1. In a brake hydraulic system including fluid pressure generating means and fluid actuating means responsive to the pressure generated in said generating means to effect a brake application, a hydraulic brake automatic adjuster comprising:

a housing defining a stepped bore therewithin having larger and smaller diameter portions with a shoulder therebetween;

a piston slidably mounted in said bore and defining an inlet chamber between one end of said piston and a corresponding end of said bore and an outlet chamber between the opposite end of said piston and the other end of said bore, said piston including a larger portion in the larger portion of the bore and a smaller portion in the smaller portion of said bore with a shoulder therebetween;

said inlet chamber being communicated to said fluid pressure generating means, said outlet chamber being communicated to said fluid actuating means, whereby said piston shifts to pressurize the fluid content of said outlet chamber in response to an increase in the fluid pressure level in the inlet chamber by operation of the fluid pressure generating means;

a circumferentially extending groove in the portion of the outer surface of said piston disposed in the smaller portion of said bore, and means communicating said inlet to said groove, whereby said groove cooperates with the edge of said shoulder to meter fluid communication from said groove into said outlet chamber when said piston shifts a predetermined distance; and resilient means yieldably urging the shoulder on the piston into sealing engagement with the shoulder on the bore when the pressure in said inlet chamber is reduced to thereby prevent flow of fluid from the outlet chamber to the inlet chamber.

2. The invention of claim 1:

the shoulders on said piston and on said bore being sloped to present complementary conical surfaces.

* * * * *